United States Patent [19]

Ando

[11] Patent Number: 4,672,275
[45] Date of Patent: Jun. 9, 1987

[54] DIGITAL PROCESS AND APPARATUS FOR CONVERGENCE CORRECTION HAVING ADJUSTMENT POINTS AND CORRECTION PORTIONS DETERMINED BY THE ADJUSTMENT POINT SELECTED

[75] Inventor: Naotaka Ando, Saitama, Japan

[73] Assignee: Sony Corporation, Tokyo, Japan

[21] Appl. No.: 775,028

[22] Filed: Sep. 11, 1985

[30] Foreign Application Priority Data

Sep. 25, 1984 [JP] Japan .................. 59-200099

[51] Int. Cl.⁴ .................. H01J 29/70; H01J 29/76
[52] U.S. Cl. .................. 315/368
[58] Field of Search .................. 358/10, 139, 65; 315/368

[56] References Cited

U.S. PATENT DOCUMENTS

| | | | |
|---|---|---|---|
| 4,093,960 | 6/1978 | Estes | 358/10 |
| 4,149,178 | 4/1979 | Estes | 358/139 |
| 4,203,051 | 5/1980 | Hallett et al. | 315/368 |
| 4,203,054 | 5/1980 | Sowter | 315/368 |
| 4,316,211 | 2/1982 | Mackey et al. | 358/10 |
| 4,401,922 | 8/1983 | Kamata et al. | 315/368 |
| 4,422,019 | 12/1983 | Meyer | 315/368 |
| 4,441,120 | 4/1984 | Garritsen | 358/139 |
| 4,485,394 | 11/1984 | Ghaem-Maghami et al. | 358/139 |
| 4,513,318 | 4/1985 | Wilensky et al. | 358/11 |
| 4,533,950 | 8/1985 | Harshbarger | 358/139 |
| 4,551,748 | 11/1985 | Mattle | 358/10 |
| 4,593,308 | 6/1986 | Kemplin | 358/139 |
| 4,593,309 | 6/1986 | Uno et al. | 358/10 |

FOREIGN PATENT DOCUMENTS 215887 12/1983 Japan .

Primary Examiner—John W. Shepperd
Attorney, Agent, or Firm—Lewis H. Eslinger; Alvin Sinderbrand

[57] ABSTRACT

A plurality of images superimposed to form a composite image on the screen of a television monitor are brought into convergence (register) by forming a reference image on the screen, the reference image including a plurality of reference points, and superimposing a test image on the reference image. The test image is similar to the reference image and includes a plurality of adjustment points respectively corresponding to the reference points. The test image further includes at least one correction portion corresponding to a given portion of the reference image, the correction portion including a given subset of the adjustment points. An adjustment point is selected within such subset, the position of the selected adjustment point is adjusted with respect to the reference point corresponding thereto, and the positions of the other points within the correction portion are simultaneously and proportionally adjusted, thereby establishing a substantial convergence of the correction portion with respect to the given portion of the reference image. The process is repeated for other corresponding image portions as necessary to establish substantial convergence of all corresponding portions of the two images. In the same manner convergence of a third image with the first two is established.

24 Claims, 21 Drawing Figures

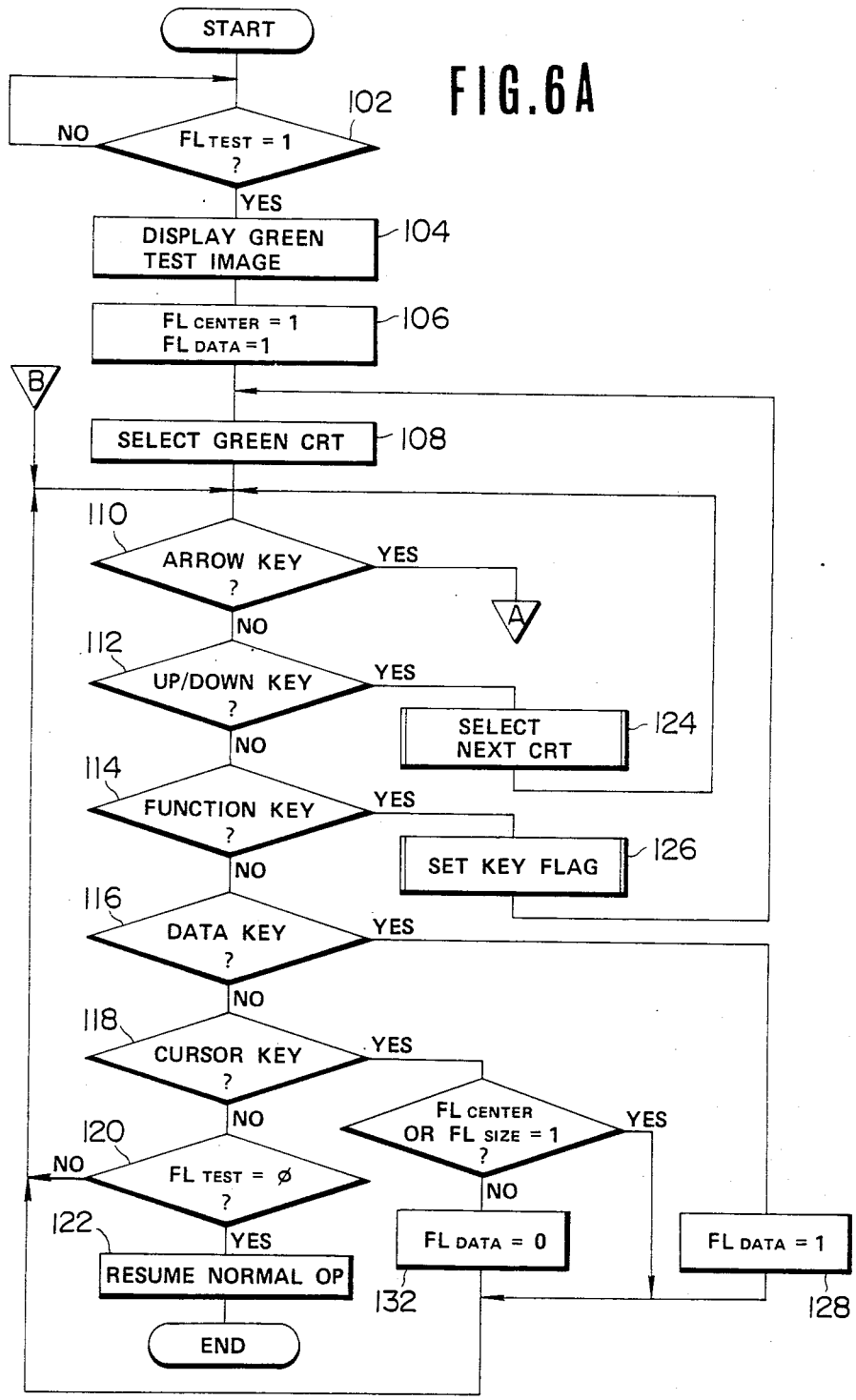

DIGITAL PROCESS AND APPARATUS FOR CONVERGENCE CORRECTION HAVING ADJUSTMENT POINTS AND CORRECTION PORTIONS DETERMINED BY THE ADJUSTMENT POINT SELECTED

BACKGROUND OF THE INVENTION

1. Field of the Invention

This invention relates to correction of convergence in color television sets, such as television monitors and projector-type television sets, and, more particularly, to a novel and highly-effective digital convergence correction process and apparatus in which substantial convergence correction is performed quickly and easily by unskilled users.

2. Description of the Prior Art

The image on the screen of a color television monitor is a composite of separate images (for example, red, green and blue images) that must be accurately superimposed or "converged" with respect to one another. Usually, a convergence correction signal is derived from analog processing of the horizontal and vertical deflection signals. Such conventional correction processes generally fail to produce sufficient accuracy. Especially in the case of tricolor projector-type television sets, the accuracy of convergence correction by conventional processes is insufficient, since even a slight misregister of the individual images noticeably degrades the composite image produced by such projector-type television sets. In cases where the television image is formed on a generally plane screen, the distance between the color television projector and various points on the screen varies as a function of displacement of the points from the optical axis of the projector. If the screen is large, e.g., about 50 inches or larger, or uneven, or if the television set has a high resolution (e.g., if the number of horizontal scan lines is twice that of conventional systems), the inaccuracy of the conventional convergence correction process has a particularly adverse effect on the quality of the image.

Digital techniques for correcting convergence have been developed in an attempt to eliminate the aforementioned defect in prior analog processes. One digital convergence correcting process is disclosed in Japanese Patent First Publication No. 58-215887, for example. The apparatus disclosed therein employs a test image or pattern, such as a dot pattern or cross-hatch pattern. The test pattern is reproduced on a television screen for convergence correction. Each dot or intersection of the test pattern is taken as an adjustment point. The correction needed at each adjustment point is derived as digital correction data. The corrections for all of the adjustment points for a given picture area are stored in a memory as digital correction data. The stored correction data for each adjustment point are read out synchronously with the beam scan on the screen. The digital correction data are converted into an analog signal indicative of the correction. The converted analog correction signal is supplied to a deflecting means that physically performs the convergence correction. This system allows the convergence to be corrected at each of the adjustment points.

In the foregoing conventional digital process for correcting convergence in a color television set, the number of adjustment points determines the accuracy of the adjustment. Thus to increase the adjustment accuracy it is necessary to increase the number of adjustment points and the number of separate adjustments. This naturally prolongs the time needed for adjustment. In addition, the adjustment is complex and requires the high level of skill found only in trained technicians. Of course, individual tastes may still be dissatisfied with the image on the screen despite the most accurate possible objective adjustment. For these reasons, it is desirable that some provision be made for easy adjustment of the color convergence by unskilled end users of the equipment.

OBJECTS AND SUMMARY OF THE INVENTION

An object of the present invention is to provide a correction process and apparatus for convergence correction that provides high accuracy in a simple and quick adjusting operation, and that provides for easy and arbitrary adjustments by an end user.

The foregoing and other objects are attained, according to one aspect of the invention, in a process for establishing convergence of a plurality of images on the screen of a television monitor, the process comprising the steps of: forming a reference image on the screen, the reference image including a plurality of reference points; superimposing a test image on the reference image, the test image being similar to the reference image and including a plurality of adjustment points respectively corresponding to the reference points and further including at least one correction portion corresponding to a given portion of the reference image, the correction portion including a given subset of the adjustment points; selecting an adjustment point within the subset; adjusting the position of the selected adjustment point with respect to the reference point corresponding thereto; and simultaneously and proportionally adjusting the positions of the other points within the correction portion, thereby effecting establishment of a substantial convergence of the correction portion with respect to the given portion of the reference image.

The foregoing and other objects are attained, according to another aspect of the invention, by apparatus for establishing convergence of a plurality of images on the screen of a television monitor; the apparatus comprising: reference means for forming a reference image on the screen, the reference image including a plurality of reference points; superimposing means for superimposing a test image on the reference image, the test image being similar to the reference image and including a plurality of adjustment points respectively corresponding to the reference points and further including at least one correction portion corresponding to a given portion of the reference image, the correction portion including a given subset of the adjustment points; and selection and adjustment means operable in a rough mode for selecting a given adjustment point within the subset, adjusting the position of the given adjustment point with respect to the reference point corresponding thereto, and simultaneously and proportionally adjusting the positions of the other points within the correction portion, thereby effecting establishment of a substantial convergence of the correction portion with respect to the given portion of the reference image.

BRIEF DESCRIPTION OF THE DRAWINGS

A better understanding of the objects, features and advantages of the invention can be gained from the following detailed description of the preferred embodiment thereof, in conjunction with the appended figures of the drawings, wherein like reference numerals designate like parts, and wherein:

FIGS. 6A and 6B together form a flowchart of a program executed during the convergence correction process according to the present invention.

DESCRIPTION OF THE PREFERRED EMBODIMENT

In performing convergence correction according to the present invention one or more large-scale or rough correction patterns are employed in addition to the fine correction data for individual adjustment points used in the prior art described above. The extent of adjustment performed with reference to the correction patterns is displayed in real time on a test image on the screen. Practical convergence correction is thus performed on the basis of both the correction pattern and the correction data with respect to individual adjustment points.

By employing pattern correction for substantially correct convergence of the television monitor, convergence correction can be performed conveniently. In addition, since the human perception of deformation or distortion of the screen image concerns an area of the screen rather than individual screen points, large-scale correction may be sufficient.

Figure 1:
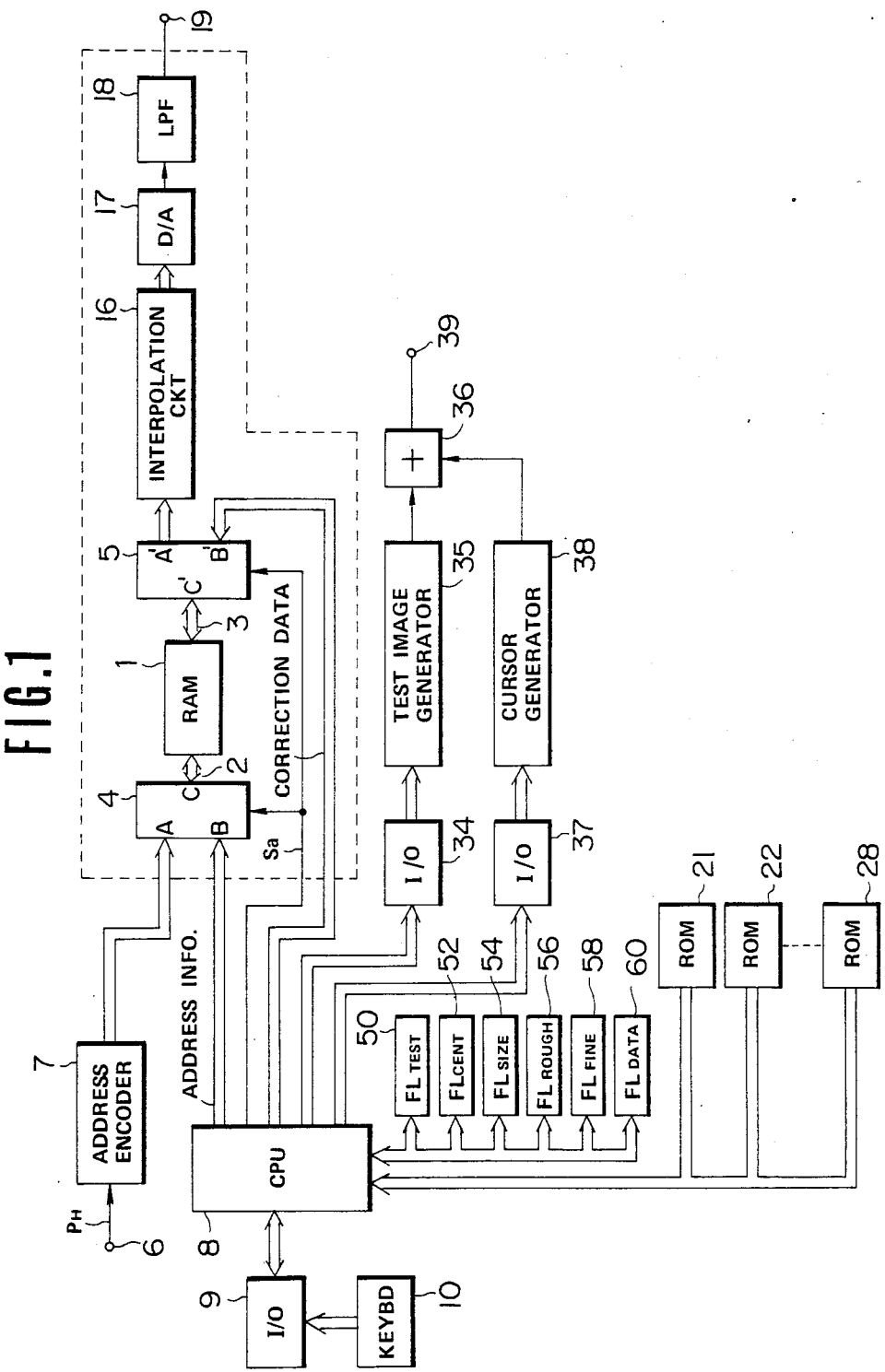
FIG. 1 is a block diagram of the preferred embodiment of convergence correcting apparatus in accordance with the present invention.

FIG. 1 shows the preferred embodiment of a convergence correcting apparatus according to the present invention. It includes a RAM (random-access memory) 1 having a plurality of addresses, each of which is adapted to store digital convergence correction data (hereinafter referred to as "correction data") for a corresponding adjustment point on a television screen. The correction data are each 8 bits, and thus each storage location or cell in the RAM 1 is adapted to store an 8-bit byte. The RAM 1 is large enough to store correction data for all of the adjustment points of one full screen.

The RAM 1 is connected to an address bus 2. The address bus 2 is bidirectional and operable in both read and write modes. The address bus 2 is connected to a switching circuit 4 that is capable of switching the address bus between the read mode and the write mode. The RAM 1 is also connected to a bidirectional data bus 3 that operates in either the read mode or the write mode. The data bus 3 is connected in turn to a switching circuit that controls the operational mode thereof. Both of the switching circuits 4 and 5 are connected by a line Sa to receive an input from a CPU (central processing unit) 8. The CPU 8 produces on the line Sa a read/write control signal hereinafter referred to as a "mode signal". The mode signal on the line Sa is either HIGH or LOW, as are all the other binary signals mentioned herein.

In the preferred embodiment, the switching circuit 4 responds to a LOW signal on the line Sa by switching the address bus 2 to the read mode. In the read mode, the switching circuit 4 connects its input A to its output C. The input A is connected to receive an input from an address encoder 7 that is connected in turn to an input terminal 6 that receives a horizontal synchronizing signal $P_H$ defining scan line timing on the television screen. The encoder 7 generates a read-address signal indicative of the next cell in the memory 1 for retrieval of the stored correction data. The encoder 7 adjusts the timing of the read-address signal in accordance with the synchronizing signal $P_H$. The switching circuit 4 has another input B that is connected to receive an input from the CPU 8. The CPU 8 generates a write-address signal indicative of the address in the RAM 1 at which correction data is to be stored. The input B is connected to the output C when a HIGH level mode signal is supplied on the line Sa to the switching circuit 4.

Similarly, the switching circuit 5 has three terminals A', B', and C'. The terminal C' is connected to receive an inout from the RAM 1 via the data bus 3. The terminal A' is connected to supply an output to an interpolation circuit 16. The interpolation circuit 16 may be of a type disclosed in U.S. Pat. No. 4,305,022. The terminal B' is connected for input of correction data from the CPU 8. The switching circuit 5 responds to a LOW-level mode signal on the line Sa by connecting the terminal C' and A' so as to supply the read correction data to the interpolation circuit 16. On the orher hand, the switching circuit 5 responds to a HIGH-level mode signal on the line Sa by connecting the terminals C' and B' so as to pass the correction data from the CPU 8 to the RAM 1 for storage.

The CPU 8 controls the read/write timing of the RAM 1 in a manner well known per se. For instance, the correction data is stored during the vertical blank period. Therefore, the CPU 8 generates the HIGH-level mode signal in synchronism with the vertical blank signal.

Figure 2:
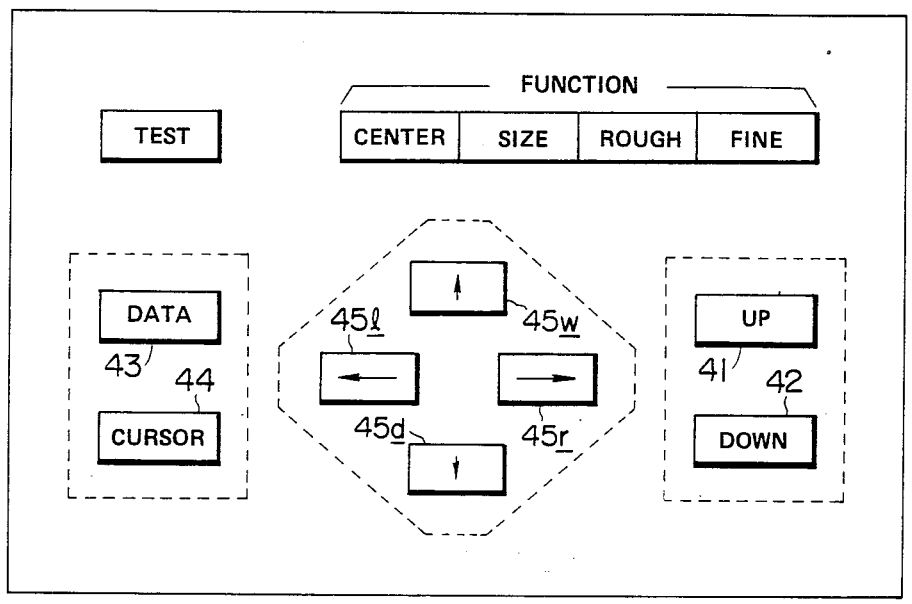
FIG. 2 is a schematic illustration of a keyboard employed in the convergence correcting apparatus of FIG. 1.

The CPU 8 is also connected to receive an input from a keyboard 10 through an input/output interface 9. As FIG. 2 shows, the keyboard 10 has function mode selector keys CENTER, SIZE, ROUGH and FINE which allow a user to select a corresponding function mode. The keyboard 10 also has UP and DOWN keys 41 and 42 used to select the CRT for which correction or adjustment of convergence is to be performed. In practice, when the UP key 41 is depressed, the selection of the color gun changes in the order green CRT - red CRT - blue CRT; and when the DOWN key 42 is depressed, the color gun selection changes in the opposite order, i.e. blue CRT - red CRT - green CRT. The keyboard 10 also has a DATA key 43 which is used to enter the adjusting (correcting) mode, a CURSOR key 44 for forming a cursor on the screen and enabling the cursor to be moved by operating any of four arrow keys 45u, 45d, 45r and 45l (hereinafter sometimes referred to collectively as keys 45), and a TEST key that causes a test image or pattern to appear on the screen. The arrow keys 45 each represent a different direction of cursor movement across the screen. The directions are respectively indicated by arrows on the keys. The distance through which the cursor moves is preferably proportional to the duration of the depression of a given key.

Alternatively, the distance through which the cursor moves is proportional to the number of times the key is depressed. Both keyboards in which the magnitude of cursor movement is determined by the number of times the arrow key is depressed and keyboards in which arrow keys incorporate a repeat function, so that the effect of the keys is multiplied in accordance with the length of time during which they are held depressed, are well known per se.

In the read mode, the interpolation circuit 16 (FIG. 1) receives the read correction data for each adjustment point on the screen. The interpolation circuit 16 derives correction values for a predetermined proportion, e.g. every other line, of the screen scan lines between two neighboring adjustment points on the basis of the correction data of such two adjustment points. The interpolation circuit 16 sends the resultant interpolated correction data together with the correction data for the two adjustment points to a D/A (digital-to-analog) converter 17. In the D/A converter 17, the digital correction data is converted into analog correction signals. The analog correction signals are supplied as an output through an LPF (low-pass filter) 18 and an output terminal 19. The output terminal 19 is connected to electromagnetic deflecting means (not shown) that performs convergence correction according to correction data supplied through the output terminal 19. As those skilled in screen scan techniques will appreciate, the LPF 18 comprises an interpolation filter for the horizontal direction.

In a tricolor tube projector-type television set, one convergence correction signal generating circuit comprising a RAM 1, switching circuits 4 and 5, an interpolation circuit 16, a D/A converter 17, and an LPF 18 is provided for convergence correction of the horizontal components of each of the three color Braun tubes or cathode-ray tubes (CRT's), and another such convergence correction signal generating circuit is provided for convergence correction of the vertical components of each of the three CRT's. Therefore, a total of six convergence correction signal generating circuits are employed in a tricolor tube projector-type television set: two for the green CRT, another two for the red CRT, and another two for the blue CRT. Only one such circuit is shown in FIG. 1, since the other five circuits are identical thereto.

In the preferred embodiment, a rough or "substantial correction" mode is established by operating the function mode selector key ROUGH (FIG. 2). Substantial correction is performed in the rough correction mode by reference to a correction pattern. The correction pattern is determined preliminarily by dividing the screen area into halves or quarters about the vertical and/or horizontal center lines of the television screen. A fine correction mode is established by operating the function mode selector key FINE. In the fine correction mode, adjustment or correction of convergence is performed for each of the adjustment points individually. Similarly, a centering mode is established by operating the function mode selector key CENTER, and a size adjustment mode is established by operating the function mode selector key SIZE.

Figure 3:
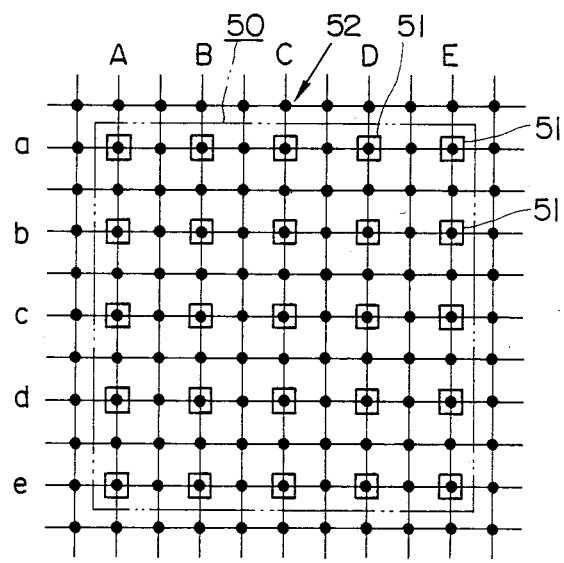
FIG. 3 is a diagram of a test image (test pattern) formed on the screen of a television monitor and employed in convergence correction performed by the apparatus of FIG. 1.
Figure 4:
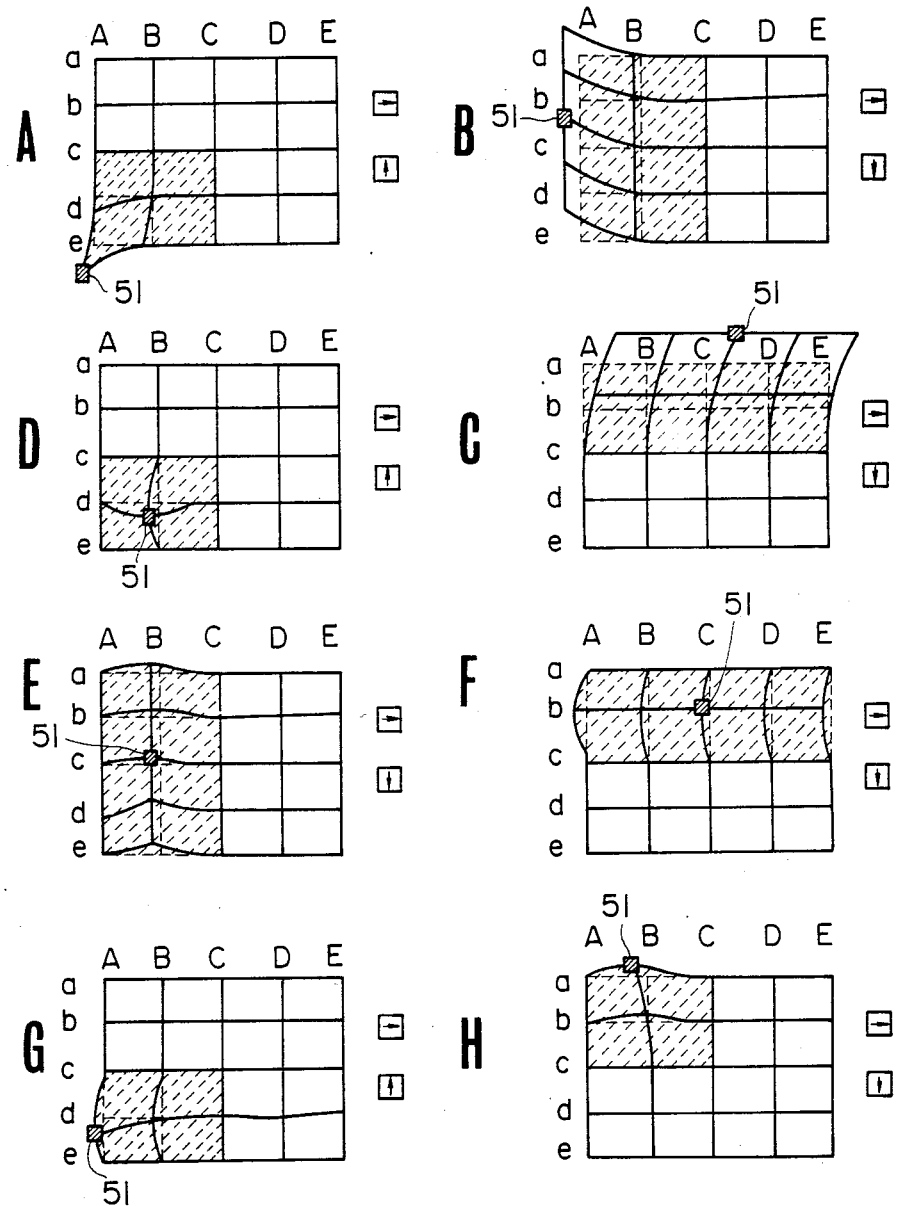
FIGS. 4A through 4H are diagrams showing various examples of substantial convergence correction performed by the apparatus of FIG. 1 by reference to various patterns of image distortion.
Figure 5:
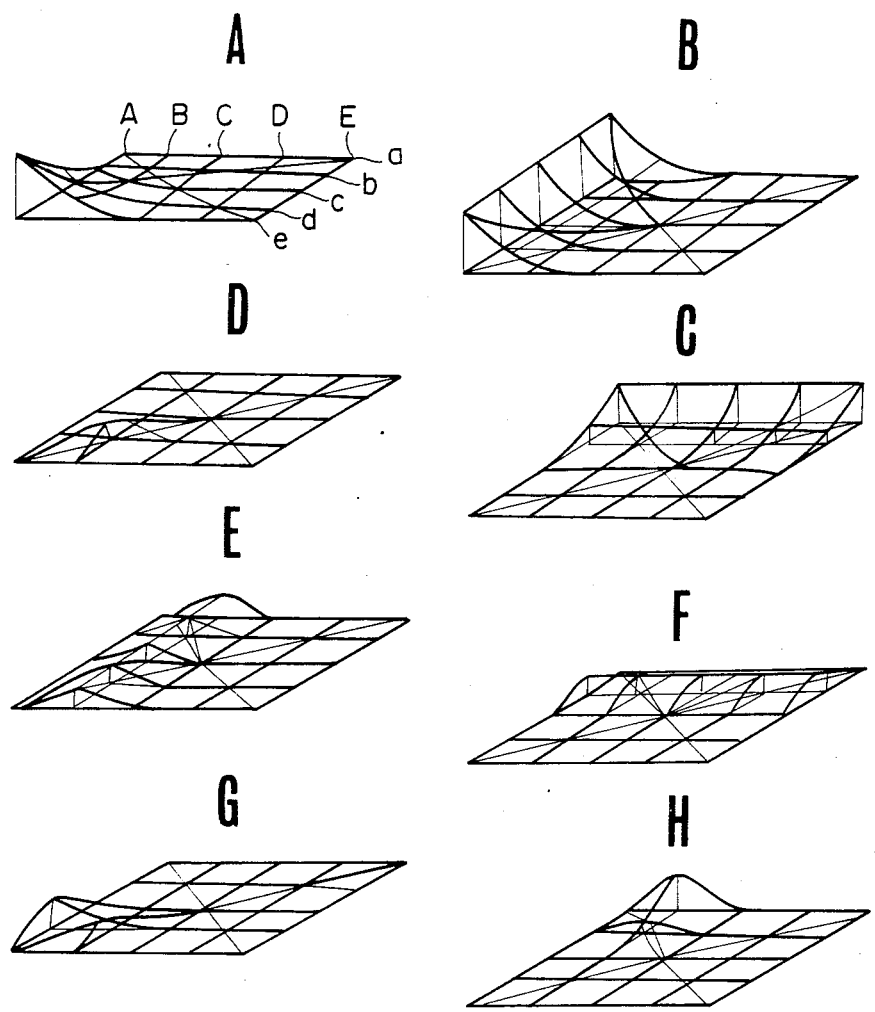
FIGS. 5A through 5H are diagrams showing various pattern data related to the corrections to the test images shown in FIGS. 4A through 4H.

Both the rough or substantial correction and the fine correction are performed by reference to a predetermined test image or pattern. FIG. 3 shows one example of a test image that can be employed in the preferred embodiment of the convergence correction apparatus.

As FIG. 3 shows, the exemplary test image, which is electronically generated and displayed on the screen of the television monitor, is cross hatched and comprises 11 vertical lines and 11 horizontal lines. Each vertical and horizontal line is separated from adjacent vertical or horizontal lines by a given constant distance, and the lines in each of the two directions are respectively parallel. Each intersection of the vertical and horizontal lines defines an adjustment point for fine correction of the convergence. Alternate vertical lines A, B, C, D and E and alternate horizontal lines a, b, c, d and e are used also for rough or substantial correction. Every intersection of the lines A, B, C, D and E and a, b, c, d, e thus defines an adjustment point for rough or substantial correction. Therefore, in the rough correction mode, the cursor 51 can be positioned only at one of the respective intersections of the lines A, B, C, D, E and a, b, c, d, e. In FIG. 3, the illustrated positions of the cursor 51 indicate all of the possible adjustment points used for rough correction. Of course, while in the rough mode the cursor can occupy any of the twenty-five positions 51 shown in FIG. 3, it occupies only one position at a time. The phantom line 50 in FIG. 3 outlines one predetermined picture area of the television screen. Of the entire set of 25 adjustment points available in the rough mode, various subsets are selected for adjustment as explained below.

As indicated above, the RAM 1 has a capacity at least large enough to accommodate correction data relating to all of the adjustment points for fine correction. To accommodate correction data relating to the adjustment points shown in FIG. 3, the RAM 1 requires at least $11 \times 11 = 121$ addresses. Each address stores correction data for a corresponding adjustment point in the form of an 8-bit two's complement code.

In order to generate the aforementioned test image, a test image generating circuit 35 (FIG. 1) is connected to receive an input from the CPU 8 through an input/output interface 34. The test image generating circuit 35 generates a serial test signal representing the two-dimensional test image 52 (FIG. 3) on the television screen. The test signal from the test image generating circuit 35 first passes through a mixer 36 (FIG. 1). The CPU 8 is also connected to supply an output to a cursor signal generating circuit 38 through an input/output interface 37. The cursor signal generating circuit 38 derives the cursor position based on direction and distance inputs from the arrow keys 45 (FIG. 2). The cursor signal generating circuit 38 (FIG. 1) produces a cursor signal representative of the position of the cursor 51 (FIG. 3) on the television screen. The cursor signal generating circuit 38 supplies the cursor signal to the mixer 36 (FIG. 1).

The mixer 36 generates a video signal by combining the test signal from the test image generating circuit 35 and the cursor signal from the cursor signal generating circuit 38. The video signal is supplied as an output to the CRT via an output terminal 39.

The CPU 8 is also connected to receive an input from a plurality of ROM's (read-only memories) 21 to 28. Each ROM 21 to 28 holds correction pattern data indicative of one or a plurality of patterns for convergence correction. The ROM's 21 to 28 generate outputs that are supplied as respective inputs to the CPU 8 through a data bus. The correction pattern data read from each of the ROM's 21 to 28 is modified by the CPU 8 by multiplying it by a given correction coefficient. The correction coefficient is determined by a linear or hyperbolic curve approximating method, known per se. The modified correction pattern data is added to or subtracted from the correction data read from the RAM 1.

FIGS. 4A to 4H and 5A to 5H illustrate the process of convergence correction using correction pattern data generated in accordance with the present invention. Eight corrections are respectively illustrated in FIGS. 4A to 4H. The same eight corrections are respectively illustrated in FIGS. 5A to 5H, and the eight corrections illustrated in FIGS. 4A through 4H respectively correspond to the eight corrections illustrated in FIGS. 5A to 5H. In FIGS. 4A to 4H, the solid lines represent a distorted test image as initially displayed on the screen and the broken lines represent the test image after adjustment. The hatched square 51 represents the cursor and the areas hatched in phantom represent the respective correction portions of the screen affected by the convergence correction adjustments. As the figures show, the correction portions are to some extent overlapping.

FIGS. 4A and 5A show one way to correct the convergence over one quarter of the screen area near one corner. In this example, convergence correction is effected in the left, lower one quarter screen area (area hatched in phantom in FIG. 4A). To effect the convergence correction shown in FIG. 4A, the cursor 51 is positioned at the adjustment point at the intersection of the vertical line A and the horizontal line e. In the following disclosure, the adjustment points are identified by the vertical and horizontal lines that respectively intersect at the adjustment points. Thus the adjustment point discussed above is identified as the adjustment point Ae. The correction portion, indicated by phantom hatch lines, includes the subset of four adjustment points Ae, Ad, Bd and Be from the entire set of 25 "rough" adjustment points. In the rough correction mode, the active adjustment point during a given correction process is the one that corresponds to the position of the cursor 51. Therefore, by moving the cursor 51 to the lower left corner position as illustrated in FIG. 4A, the adjustment point Ae is automatically selected. Selection of the adjustment point Ae implies selection of the adjustment points Ad, Bd and Be also, so that these points will also be adjusted by a predetermined proportion of the correction applied to the cursor-selected adjustment point Ae. Of course the positions of the fine adjustment points and indeed of all of the points within the correction portion are adjusted simultaneously and proportionally.

In the example (FIG. 4A), the rightward arrow key 45r (FIG. 2) is operated to move the cursor 51 together with the adjustment point Ae horizontally to the right until the cursor 51 reaches the imaginary vertical straight line A (FIG. 4A). Thereafter, the upward arrow key 45u (FIG. 2) is operated to move the cursor 51 together with the adjustment point Ae upward along the vertical line A until the cursor 51 reaches the desired corner position, i.e. until it reaches the subjectively straight horizontal line e. Of course, the arrow keys can be operated in either sequence, and if an adjustment is carried too far in one direction, the cursor 51 can be moved in the reverse direction by means of the leftward or downward arrow key 45l or 45d, as may be required. In short, the various arrow keys 45 can be operated repeatedly in any sequence until the desired adjustment has been made. Moreover, to correct certain distortions, one may begin with the keys 45l and 45d.

In FIG. 5A, the correction magnitude, i.e. the extent of the positional adjustment of the adjustment point Ae from its initial position, is illustrated in terms of displacement along a third coordinate axis. This correction pattern can be used for convergence correction at any of the corners Aa, Ea and Ee as well as Ae.

FIGS. 4B and 5B illustrate a second type of rough or substantial convergence correction. In this case convergence is corrected over half of the screen area and predominantly along an edge thereof. In the example, the left side of the screen is distorted. In order substantially to correct this, the cursor 51 is positioned at the adjustment point Ac midway along the edge to be adjusted. In this case, the right-hand arrow key 45r and the downward arrow key 45d are operated in any sequence until the cursor 51 reaches the proper position of the adjustment point Ac illustrated by the intersections of the broken lines A and c. The movement of the adjustment point Ac together with the cursor 51 effects movement of nine other adjustment points Aa, Ab, Ad, Ae, Ba, Bb, Bc, Bd and Be. These points are all shifted in substantially the same direction as the direction in which the adjustment point Ac is shifted. The points Aa, Ab, Ad and Ae are shifted a distance substantially equal to the distance through which the point Ac is shifted, while the points Ba, Bb, Bc, Bd and Be are shifted through a distance less than but proportional to the distance through which the adjustment point Ac is shifted. To correct certain distortions, the keys 45l and 45u may be employed.

Those skilled in the art will understand that, in order to correct the convergence on the right half of the screen area, the cursor 51 is placed at the adjustment point Ec.

FIGS. 4C and 5C show a third kind of correction pattern. This third correction pattern is similar to that shown in FIGS. 4B and 5B but is used for convergence correction in the upper and lower halves of the screen. In this case, the cursor 51 is placed over the adjustment point Ca. During rough or substantial correction, the adjustment point Ca shifts in the direction and through the distance specified by the arrow keys 45. In the example, the left-hand arrow key 45l and the downward arrow key 45d are operated so that the cursor 51 moves to the correct position illustrated by the intersections of the broken lines C and a. The nine adjustment points Aa, Ab, Ba, Bb, Cb, Da, Db, Ea and Eb are automatically shifted by this adjustment, in substantially the same direction as the direction in which the point Ca is shifted. The points Aa, Ba, Da and Ea are shifted a distance substantially equal to the distance through which the point Ca is shifted, while the points Ab, Bb, Cb, Db and Eb are shifted through a distance less than but proportional to the distance through which the point Ca is shifted. This brings all of these points to the subjectively correct positions indicated by the respective intersections of the broken lines. To correct certain distortions, the keys 45r and 45u may be employed.

Of course, when the lower half of the screen area is to be corrected, the cursor 51 is placed over the adjustment point Ce. Otherwise the process is the same as for correction of the upper half of the screen area.

The three correction patterns discussed above are the principal correction patterns for normal use. Because of the nature of the common beam deflection errors, the five correction patterns discussed below with reference to FIGS. 4D through 4H and FIGS. 5D through 5H will be used much less frequently. The previously discussed patterns correct distortion at a corner or along an edge of the screen, where the greatest deviations from symmetry both horizontally and vertically occur. In the following cases, the distortion occurs either about a point on the screen or along a line parallel to and within the edges of the screen.

FIGS. 4D and 5D show a fourth correction pattern, used when convergence correction concerns only a quarter of the screen area and is centered about an adjustment point at the center of a screen quadrant. In this case, the cursor 51 together with the adjustment point Bd is moved by operation of the right-hand arrow key 45r and the upward arrow key 45u to the correct position. As those skilled in the art will understand, to correct other distortions, the keys 45l and 45d may be employed.

For similar correction of the other quadrants of the screen, the cursor 51 is placed over the corresponding center adjustment points Bb, Db and Dd.

FIGS. 4E and 5E show a fifth correction pattern, used when the vertical line B between the vertical edge A and the vertical centerline C is distorted vertically and/or horizontally. In order to perform this type of convergence correction, the cursor 51 is placed over the adjustment point Bc. Then, the right-hand arrow key 45r and the downward arrow key 45d are operated so as to move the cursor 51 and the adjustment point Bc to the correct position shown in FIG. 4E by the intersection of the broken lines B and c. The adjustment points Ba, Bb, Bd and Be on the vertical line B are shifted substantially in the same direction and substantially to the same extent as the adjustment point Bc. As those skilled in the art will understand, to correct certain other distortions, the keys 45l and 45u may be employed.

When this convergence correction is to be applied to the vertical line D, the cursor 51 is of course placed at the adjustment point Dc.

FIGS. 4F and 5F show a sixth correction pattern, used to correct vertical and/or horizontal offset of the horizontal lines b and d between the horizontal edges a and e and the horizontal centerline c. This correction is similar to that discussed above in connection with FIGS. 4E and 5E. In FIGS. 4F and 5F, the convergence along the horizontal line b is to be corrected. The right-hand arrow key 45r and the downward arrow key 45d are operated to shift the adjustment point Cb to the correct position indicated by the intersection of the broken lines C and b. All of the other adjustment points along the horizontal line b shift in the same direction and to the same extent to their respective correct positions shown by the respective intersections of the broken lines A, B, D and E with the horizontal broken line b. Of course, to correct certain other distortions, the keys 45l and 45u may be employed.

FIGS. 4G and 5G show a seventh correction pattern, used to correct offset of an adjustment point, such as Ad, located along a vertical edge without affecting the horizontal edges or the horizontal centerline. Analogously to the preceding examples, the cursor 51 is first positioned over the adjustment point Ad. Then it is moved together with the adjustment point Ad to the correct position shown by the intersection of the broken lines A and d by operating the right-hand arrow key 45r and the upward arrow key 45u. To correct certain other distortions, the keys 45l and 45d may be employed.

When the seventh correction pattern is to be applied to another quadrant, the cursor 51 is placed over the corresponding adjustment point Ab, Eb or Ed.

FIGS. 4H and 5H show the eighth correction pattern, which is similar to the seventh pattern. The convergence about an adjustment point such as the point Ba, located on a horizontal edge a or e and on one of the vertical lines B or D between the vertical edge A or E and the vertical centerline C, is corrected without affecting the adjoining vertical edge or the vertical centerline. In the example illustrated, the cursor 51 is placed over the adjustment point Ba. The right-hand arrow key 45r (FIG. 2) and the downward arrow key 45d are operated to move the adjustment point Ba to the right and downwards to the correct position. Of course, to correct certain other distortions, the keys 45l and 45u may be employed.

From the preceding description, it can be seen that an operator of apparatus in accordance with the invention makes corrections in the rough mode as shown in the following table:

TABLE

| KEY | FUNCTION |
| --- | --- |
| Test Key | Green test pattern appears. Centering correction mode selected. |
| Arrow Keys 45 | Raster center of green, red and blue test patterns simultaneously corrected. Raster moved in accordance with arrow directions. |
| SIZE Key | Size correction mode selected. |
| Arrow Keys 45 | Raster size for green, red and blue test patterns simultaneously corrected. Right arrow enlarges horizontal dimension; left arrow contracts it. Up arrow enlarges vertical dimension; down arrow contracts it. |
| Key 41 | Green and Red test patterns appear. |
| ROUGH Key | Rough convergence mode selected. |
| Key 44 | Cursor moving mode selected. Cursor reappears at center reference point. |
| Arrow Keys 45 | Cursor moves to selected intersection. |
| Data Key 43 | Cursor locks on. |
| Arrow Keys 45 | Red distortion corrected in selected segment so that red pattern is coincident with green pattern. (Jump to fourth step below when all distortion has been corrected.) |
| Key 44 | Cursor moving mode selected. Cursor reappears at former reference point. |
| Arrow Keys 45 | Cursor moves to next selected intersection. |
| Data Key 43 | Cursor locks on. (Jump to third step above and repeat as necessary for other screen areas.) |
| Key 41 | Green and Blue test patterns appear. |
| ROUGH Key | Rough convergence mode selected. |
| Key 44 | Cursor moving mode selected. Cursor reappears at center reference point. |
| Arrow Keys 45 | Cursor moves to selected intersection. |
| Data Key 43 | Cursor locks on. |
| Arrow Keys 45 | Blue distortion corrected in selected segment so that blue pattern is coincident with green (and red) patterns. (Jump to fourth step below when all distortion has been corrected.) |
| Key 44 | Cursor moving mode selected. Cursor reappears at former reference point. |
| Arrow Keys 45 | Cursor moves to next selected intersection. |
| Data Key 43 | Cursor locks on. (Jump to third step above and repeat as necessary for other screen areas.) |
| Test Key | Resume normal operations. |

The overall convergence control operation performed by the preferred embodiment of the convergence control apparatus according to the present invention is described below with reference to FIGS. 6A and 6B. In order to enter a test mode, the TEST key (FIG. 2) is depressed. If the TEST key is not depressed, the television set does not enter the test mode and thus operates in its normal mode. To check for operation of the TEST key, a test mode indicator flag $FL_{TEST}$ in a flag register 50 (FIG. 1) is checked at a step 102 (FIG. 6A), immediately after the start of the execution of the program. If the test mode indicator flag $FL_{TEST}$ is not set when checked at step 102, then the program loops until the TEST key is depressed, and the television set remains in its normal operating state. After the TEST key is depressed and thus the test mode indicator flag $FL_{TEST}$ is set in the flag register 50, a test pattern such as the one shown in FIGS. 4A to 4H is electronically generated and displayed on the television screen at step 104. Thereafter, initialization is performed at step 106, which includes setting the centering mode and data mode. At step 108, an initial CRT (e.g., the green CRT) is selected and set. At the next step 110, the arrow keys 45 are checked to see whether any of them have been operated.

If no arrow keys 45 have been operated when checked at step 110, the UP key 41 and the DOWN key 42 are checked for depression at step 112. If neither the UP key 41 nor the DOWN key 42 has been operated, then, at step 114, the function keys CENTER, SIZE, ROUGH and FINE are checked for depression. If none of the function keys have been operated when checked at step 114, the DATA key 43 is checked for depression at step 116. If at step 116 it is determined that the DATA key 43 has not been depressed, the CURSOR key 44 is checked for depression at step 118. If the CURSOR key 44 has not been operated when checked at step 118, then the TEST key is checked again for depression at step 120. If the TEST key has not been depressed, the program loops back to step 110. On the other hand, if the TEST key has again been depressed when checked at step 120, then the television set leaves the test mode, and the input video signal (e.g., a broadcast signal) is processed to produce a display on the screen as normal operation of the television set resumes. This is represented at step 122.

If either the UP key 41 (FIG. 2) or the DOWN key 42 is depressed when checked at step 112 (FIG. 6A), the next color CRT for which convergence correction is to be performed is switched in at step 124. It is within the scope of the invention that, when convergence correction is to be performed for the green CRT, the test images for the red CRT and the blue CRT are also formed on the screen along with the test image for the green CRT; when convergence correction is to be performed for the blue CRT, the test images for the red and green CRTs are formed on the screen along with the test image for the blue CRT; and when convergence correction is performed for the blue CRT, the test images for the red CRT and the green CRT are formed on the screen along with the test image for the blue CRT. Each time the UP mode selector key 41 (FIG. 2) is depressed, the CRT for which convergence control is to be performed is switched in the order green-red-blue. Each time the DOWN mode selector key 42 is depressed, the CRT for which convergence control is to be performed is switched in the reverse order: i.e., blue-red-green. After CRT selection in the block 124 (FIG. 6A), the program returns to step 110.

If any of the function keys CENTER, SIZE, ROUGH or FINE (FIG. 2) is depressed when checked at step 114 (FIG. 6A), a flag $FL_{CENTER}$, $FL_{SIZE}$, $FL_{ROUGH}$ or $FL_{FINE}$ (FIG. 1) indicative of the selected function mode is set in a corresponding flag register 52, 53, 56 or 58 at step 126 (FIG. 6A). After the flag $FL_{CENTER}$, $FL_{SIZE}$, $FL_{ROUGH}$ or $FL_{FINE}$ corresponding to the depressed mode function key is set, the program returns to step 108.

When depression of the DATA key 43 (FIG. 2) is detected upon checking at step 116 (FIG. 6A), a data mode indicative flag $FL_{DATA}$ (FIG. 1) is set in a flag register 60 at step 128 (FIG. 6A) and then the program returns to step 110. When depression of the CURSOR key 44 (FIG. 2) is detected at the step 118 (FIG. 6A), then flags $FL_{CENTER}$ and $FL_{SIZE}$ (FIG. 1) are checked at step 130 (FIG. 6A) to see if they are set. If either the flag $FL_{CENTER}$ or the flag $FL_{SIZE}$ is set, then the program returns to step 110. On the other hand, if neither the flag $FL_{CENTER}$ nor the flag $FL_{SIZE}$ is set when checked at step 130, then cursor mode is set at step 132 and the program returns to step 110.

Figure 6B:
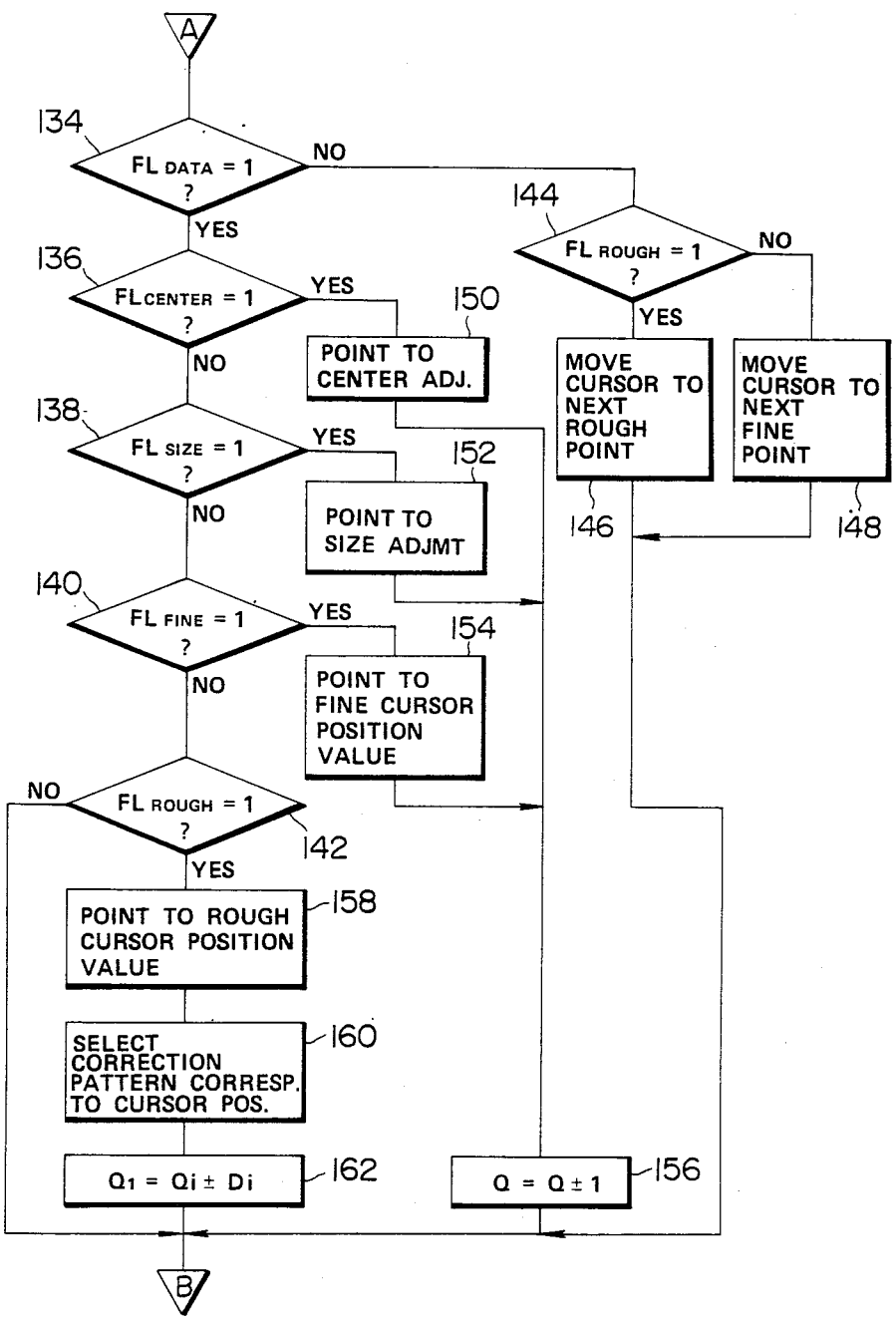

When one of the arrow keys 45 (FIG. 2) is depressed and depression of the depressed arrow key 45 is detected at step 110 (FIG. 6A), the data mode indicative flag $FL_{DATA}$ (FIG. 1) is checked at step 134 (FIG. 6B). If the data mode indicative flag $FL_{DATA}$ is set when checked at step 134, then the flag $FL_{CENTER}$ is checked at step 136. If the flag $FL_{CENTER}$ is not set when checked at step 136, the flag $FL_{SIZE}$ is checked at step 138 to determine whether or not it is set. If the flag $FL_{SIZE}$ is not set when checked at step 138, the flag $FL_{FINE}$ is checked to see if it is set at step 140. If the flag $FL_{FINE}$ is not set when checked at step 140, then the flag $FL_{ROUGH}$ is checked at step 142 to determine whether or not it is set. If the flag $FL_{ROUGH}$ is also not set, then the program returns to step 110 (FIG. 6A).

If the flag $FL_{DATA}$ is not set when checked at step 134 (FIG. 6B), then the flag $FL_{ROUGH}$ is checked again at step 144. If the flag $FL_{ROUGH}$ is set, then, at step 146, the cursor 51 is moved discontinuously (stepwise) in the direction or directions designated by the depressed arrow key or keys 45 to the next rough adjustment point, i.e., from one to another of the adjustment points defined by the respective intersections of the vertical and horizontal lines A, B, C, D, E and a, b, c, d, e (FIGS. 3–5), so as to select one of the adjustment points for rough correction. This selection process also identifies one of the correction patterns shown in FIGS. 4 and 5. On the other hand, if the flag $FL_{ROUGH}$ is not set when checked at step 144 (FIG. 6B), then, at step 148, the cursor 51 is moved in the direction or directions designated by the depressed arrow key or keys 45 to the next fine adjustment point to identify the adjustment point at which fine correction is to be performed. Such movement is also discontinuous or stepwise but is from one to another of the adjustment points defined by the respective intersections of all of the vertical and horizontal lines of FIG. 3. After execution of one of the blocks 146 and 148, the program returns to step 110 (FIG. 6A).

If the centering mode indicator flag $FL_{CENTER}$ is set when checked at step 136 (FIG. 6B), a centering operation for the test pattern of the CRT selected at step 108 or 124 (FIG. 6A), which CRT is sometimes referred to hereinafter as the "selected CRT", is performed at step 150 (FIG. 6B). In the centering operation, the memory address of a deviation value of the test pattern center of the selected CRT from the screen center of the selected CRT is set in a memory pointer as indicated at step 150 for use later. Similarly, if the size adjusting mode indicator flag $FL_{SIZE}$ is set when checked at step 138, the memory address of a size adjustment value is set in a memory pointer as indicated at step 152. The size adjustment value represents the deviation of the test pattern size of the selected CRT from the screen size of the selected CRT. If the fine correction mode indicative flag $FL_{FINE}$ is set when checked at the step 140, then a memory address corresponding to the cursor position is identified, as indicated at step 154. After any of steps 150, 152 or 154, the data Q stored in the identified memory address is updated by adding or subtracting 1 to or from the stored data value Q at step 156. In practice, if the depressed arrow key is 45$u$ or 45$r$, the stored data value is incremented by 1, and if the depressed arrow key is the 45$d$ and 45$l$, then the stored data value is decremented by 1.

If the rough correction mode indicator flag $FL_{ROUGH}$ is set when checked at step 142, then the memory address corresponding to the cursor position is identified at step 158. The correction pattern corresponding to the cursor position is selected at step 160. After selecting the proper correction pattern, the position data values $Q_i$ for the cursor and all of the related adjustment points in the pattern are adjusted by corresponding values $\pm D_i$ at step 162. The values $D_i$ are predetermined for each of the correction patterns and each type of point in each pattern and may differ from those in other correction patterns. As in step 156, when the depressed arrow key (FIG. 2) is 45$u$ or 45$r$, the given value $D_n$ is added to the stored value $Q_n$, and when the depressed arrow key is 45$d$ or 45$l$, the stored data value $Q_n$ is decremented by the given value $D_n$. After execution of either of steps 156 and 162, the program returns to step 110 (FIG. 6A).

As long as the arrow key 45 is depressed, steps 134 to 162 are repeated cyclically.

Thus there is provided in accordance with the invention a novel and highly-effective convergence correction process and apparatus that provides high accuracy in a simple and quick adjusting operation, and that provides for easy and arbitrary adjustments by an end user.

Many modifications of the preferred embodiment of the invention will readily occur to those skilled in the art upon consideration of this disclosure. For example, the number and kinds of correction patterns and the means of identifying the correction patterns to be used can all be varied within wide limits, as those skilled in the art will readily understand. Accordingly, the invention is limited only by the appended claims.

I claim:

1. A process of establishing convergence of a plurality of images on the screen of a television monitor; said process comprising the steps of:

forming a reference image on said screen, said reference image including a plurality of reference points;

superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points;

moving a cursor to select an adjustment point within said subset, said adjustment point determining said correction portion;

adjusting the position of said selected adjustment point with respect to the reference point corresponding thereto; and simultaneously and proportionally adjusting the positions of the other points within said correction portion, thereby effecting establishment of a substantial convergence of said correction portion with respect to said given portion of said reference image.

2. A process according to claim 1; wherein said other points within said correction portion are moved in directions substantially parallel to the adjustment of said selected adjustment point.

3. A process according to claim 1; wherein said other points within said correction portion are moved through distances respectively equal or less than the distance through which said selected adjustment point is moved.

4. A process according to claim 1; wherein said monitor comprises three beam-generating means and is capable of normal operation in which it displays color television images on said screen and wherein said forming of said reference image is by means of one of said beam-generating means and said superimposing of said test image is by means of another of said beam-generating means; further comprising:

selecting any of said beam-generating means to form said reference image and either of the other of said beam-generating means to form said test image.

5. A process according to claim 4; comprising thereafter selecting the third of said beam-generating means to form said test image, thereby establishing a substantial convergence of corresponding portions of images respectively displayed by said three beam-generating means.

6. A process of establishing convergence of a plurality of images on the screen of a television monitor, said process comprising the steps of:

forming a reference image on said screen, said reference image including a plurality of reference points;

superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points;

moving a cursor to select an adjustment point within said subset, said adjustment point determining said correction portion;

adjusting the position of said selected adjustment point with respect to the reference point corresponding thereto; and simultaneously and proportionally adjusting the positions of the other points within said correction portion, thereby effecting establishment of a substantial convergence of said correction portion with respect to said given portion of said reference image;

wherein said selecting comprises the steps of:

generating said cursor on said screen;

moving said cursor to a given adjustment point; and locking said cursor onto said given adjustment point.

7. A process of establishing convergence of a plurality of images on the screen of a television monitor, said process comprising the steps of:

forming a reference image on said screen, said reference image including a plurality of reference points;

superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points;

selecting an adjustment point within said subset;

adjusting the position of said selected adjustment point with respect to the reference point corresponding thereto; and simultaneously and proportionally adjusting the positions of the other points within said correction portion, thereby effecting establishment of a substantial convergence of said correction portion with respect to said given portion of said reference image;

wherein said reference image further includes a plurality of additional reference points and said test image further includes a plurality of additional adjustment points respectively corresponding to said additional reference points; and further comprising:

selecting any of said adjustment points and additional adjustment points and adjusting the position thereof with respect to reference points respectively coresponding thereto without adjusting the positions of the other adjustment points and additional adjustment points; and repeating for as many adjustment points and additional adjustment points as necessary to establish a fine convergence of said test image with respect to said reference image.

8. A process according to claim 7; wherein said selecting of any of said adjustment points and additional adjustment points and adjusting the position thereof to establish said fine convergence is effected after said establishment of said substantial convergence.

9. A process of establishing convergence of a plurality of images on the screen of a television monitor, said process comprising the steps of:

forming a reference image on said screen, said reference image including a plurality of reference points;

superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points;

moving a cursor to select an adjustment point within said subset, said adjustment point determining said correction portion;

adjusting the position of said selected adjustment point with respect to the reference point corresponding thereto; and simultaneously and proportionally adjusting the positions of the other points within said correction portion, thereby effecting establishment of a substantial convergence of said correction portion with respect to said given portion of said reference image;

wherein said selected adjustment point within said subset has an initial displacement with respect to the reference point corresponding thereto at least as great as the initial displacement of any of said other adjustment points within said subset with respect to the reference points respectively corresponding thereto.

10. A process of establishing convergence of a plurality of images on the screen of a television monitor, said process comprising the steps of:

forming a reference image on said screen, said reference image including a plurality of reference points;

superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points;

moving a cursor to select an adjustment point within said subset, said adjustment point determining said correction portion;

adjusting the position of said selected adjustment point with respect to the reference point corresponding thereto; and simultaneously and proportionally adjusting the positions of the other points within said correction portion, thereby effecting establishment of a substantial convergence of said correction portion with respect to said given portion of said reference image;

wherein said test image includes at least a second correction portion corresponding to a second portion of said reference image different from said given portion, said second correction portion including a second subset of said adjustment points different from said given subset; and further comprising steps of:

selecting a second adjustment point within said second subset;

adjusting the position of said second adjustment point with respect to the reference point corresponding thereto; and simultaneously and proportionally adjusting the positions of the other pionts within said second correction portion, thereby establishing a substantial convergence of said second correction portion with respect to said second portion of said reference image.

11. A process of establishing convergence of a plurality of images on the screen of a television monitor, said process comprising the steps of:

forming a reference image on said screen, said reference image including a plurality of reference points;

superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points;

moving a cursor to select an adjustment point within said subset, said adjustment point determining said correction portion;

adjusting the position of said selected adjustment point with respect to the reference point corresponding thereto; and simultaneously and proportionally adjusting the positions of the other points within said correction portion, thereby effecting establishment of a substantial convergence of said correction portion with respect to said given portion of said reference image;

wherein said test image includes a plurality of correction portions respectively corresponding to different portions of said reference image and including different subsets of said adjustment points; further comprising:

determining, in dependence on said selection of one of said adjustment points, one of said correction portions the positions of other points of which are simultaneously and proportionally adjusted.

12. Apparatus for establishing convergence of a plurality of images on the screen of a television monitor; said apparatus comprising:

reference means for forming a reference image on said screen, said reference image including a plurality of reference points;

superimposing means for superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points;

selection and adjustment means including a cursor operable in a rough mode for selecting a given adjustment point which is within said subset and determines said correction portion, adjusting the position of said given adjustment point with respect to the reference point corresponding thereto, and simultaneously and proportionally adjusting the positions of the other points within said correction portion, thereby effecting establishment of substantial convergence of said correction portion with respect to said given portion of said reference image.

13. Apparatus according to claim 12; wherein said monitor comprises three beam-generating means and is capable of normal operation in which it displays color television images on said screen and wherein said reference means comprises one of said beam-generating means and said superimposing means comprises another of said beam-generating means; further comprising:

function means operative to select any of said beam-generating means to form said reference image and either of the other of said beam-generating means to form said test image.

14. Apparatus according to claim 13; wherein said function means is thereafter operative to select the third of said beam-generating means to form said test image, thereby establishing a substantial convergence of corresponding portions of images respectively displayed by said three beam-generating means.

15. Apparatus according to claim 14; wherein six of said selection and adjustment means are provided, a first three adjusting the vertical positions of said given adjustment points of test images respectively formed by said three beam-generating means and a second three adjusting the horizontal positions of said given adjustment points of test images respectively formed by said three beam-generating means.

16. Apparatus according to claim 12; further comprising means for centering said reference and test images on said screen.

17. Apparatus according to claim 12; further comprising means for adjusting the size of said reference and test images.

18. Apparatus according to claim 12; further comprising random-access memory means having a separate memory address corresponding to each of said adjustment points and means for generating values respectively corresponding to the displacements of said adjustment points from said respective reference points, said values being stored in said respective memory addresses.

19. Apparatus for establishing convergence of a plurality of images on the screen of a television monitor, said apparatus comprising:

reference means for forming a reference image on said screen, said reference image including a plurality of reference points;

superimposing means for superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points; and selection and adjustment means including a cursor operable in a rough mode for selecting a given adjustment point which is within said subset and determines said correction portion, adjusting the position of said given adjustment point with respect to the reference point corresponding thereto, and simultaneously and proportionally adjusting the positions of the other points within said correction portion, thereby effecting establishment of substantial convergence of said correction portion with respect to said given portion of said reference image;

wherein said test image includes a plurality of correction portions respectively corresponding to different portions of said reference image and including different subsets of said adjustment point; and selection of one of said adjustment points by said selection and adjustment means determines one of said correction portions the positions of the other points of which are simultaneously and proportionally adjusted by said selection and adjustment means;

whereby sequential selection and adjustment of one of said adjustment points in each of a plurality of said correction portions establishes a rough convergence of the entirety of said test image with respect to said reference image.

20. Apparatus according to claim 19 wherein a plurality of said correction portions are in overlapping relation.

21. Apparatus for establishing convergence of a plurality of images on the screen of a television monitor, said apparatus comprising:

reference means for forming a reference image on said screen, said reference image including a plurality of reference points;

superimposing means for superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points; and selection and adjustment means including a cursor operable in a rough mode for selecting a given adjustment point which is within said subset and determines said correction portion, adjusting the position of said given adjustment point with respect to the reference point corresponding thereto, and simultaneously and proportionally adjusting the positions of the other points within said correction portion, thereby effecting establishment of substantial convergence of said correction portion with respect to said given portion of said reference image;

wherein said selection and adjustment means comprises means for generating a cursor on said screen, moving said cursor to a given adjustment point, and locking said cursor onto said given adjustment point.

22. Apparatus for establishing convergence of a plurality of images on the screen of a television monitor, said apparatus comprising:

reference means for forming a reference image on said screen, said reference image including a plurality of reference points;

superimposing means for superimposing a test image on said reference image, said test image being similar to said reference image and including a plurality of adjustment points respective corresponding to said reference points and further including at least one correction portion corresponding to a given portion of said reference image, said correction portion including a given subset of said adjustment points; and selection and adjustment means operable in a rough mode for selecting a given adjustment point within said subset, adjusting the position of said given adjustment point with respect to the reference point corresponding thereto, and simultaneously and proportionally adjusting the positions of the other points within said correction portion, thereby effecting establishment of substantial convergence of said correction portion with respect to said given portion of said reference image;

wherein said reference image further includes a plurality of additional reference points and said test image further includes a plurality of additional test points respectively corresponding to said additional reference points, and further comprising:

function means for controlling said selection and adjustment means so that it selectively operates in a fine mode for:

selecting any of said adjustment points and additional adjustment points and adjusting the position of said selected adjustment point or additional adjustment point without adjusting the positions of the other adjustment points and additional adjustment points; and repeating for as many adjustment points and additional adjustment points as necessary to establish a fine convergence of said test image with respect to said reference image.

23. Apparatus according to claim 22 further comprising random-access memory means having a separate memory address corresponding to each of said adjustment points and additional adjustment points and means for generating values respectively corresponding to the displacement of said adjustment points and additional adjustment points from said respective reference points, said values being stored in said respective memory addresses.

24. Apparatus for establishing convergence of a plurality of images on the screen of a television monitor, said apparatus comprising:

reference means for forming a reference image on said screen, said reference image includng a plurality of reference points;

superimposing means for superimposing a test image on said reference image, said test image being similar to said reference image and including a plurality of adjustment points respectively corresponding to said reference points and further including at least one correction portion corresponding to a given portion of said reference image, said correction portion including a given subset of said adjustment points; and selection and adjustment means including a cursor operable in a rough mode for selecting a given adjustment point which is within said subset and determines said correction portion, adjusting the position of said given adjustment point with respect to the reference point corresponding thereto, and simultaneously and proportionally adjusting the positions of the other points within said correction portion, thereby effecting establishment of substantial convergence of said correction portion with respect to said given portion of said reference image;

wherein a pair of said selection and adjustment means are provided, a first adjusting the position of said given adjustment point in the vertical direction of said screen and the second adjusting the position of said given adjustment point in the horizontal direction of said screen.

* * * * *